(12) United States Patent
Matysiak et al.

(10) Patent No.: US 11,847,865 B2
(45) Date of Patent: Dec. 19, 2023

(54) APP ASSISTED VOTING

(71) Applicant: KYOCERA Document Solutions Inc., Osaka (JP)

(72) Inventors: Jacek Joseph Matysiak, Concord, CA (US); Dilinur Wushour, Clayton, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 420 days.

(21) Appl. No.: 17/154,876

(22) Filed: Jan. 21, 2021

(65) Prior Publication Data

US 2022/0230500 A1 Jul. 21, 2022

(51) Int. Cl.
*G07C 13/00* (2006.01)
*H04L 9/40* (2022.01)
*H04N 1/00* (2006.01)

(52) U.S. Cl.
CPC .......... *G07C 13/00* (2013.01); *H04L 63/0853* (2013.01); *H04L 63/0884* (2013.01); *H04L 63/102* (2013.01); *H04N 1/00328* (2013.01)

(58) Field of Classification Search
CPC . G07C 13/00; H04L 63/0853; H04L 63/0884; H04L 63/102; H04N 1/00328

USPC ......................................................... 235/386
See application file for complete search history.

(56) References Cited

U.S. PATENT DOCUMENTS

| 8,397,988 | B1 | 3/2013 | Zuili |
| 2002/0152379 | A1 | 10/2002 | Gefwert et al. |
| 2018/0350180 | A1 | 12/2018 | Onischuk |
| 2022/0005304 | A1* | 1/2022 | Murray .................. G07C 13/00 |

* cited by examiner

*Primary Examiner* — Daniel A Hess
(74) *Attorney, Agent, or Firm* — W. Webostad

(57) ABSTRACT

Systems and methods relate generally to app assisted voting. In an example method thereof, a voting app is installed in a mobile device. The mobile device has a memory configured to store program code for the voting app. The mobile device has a processor coupled to the memory. The processor, in response to executing the program code, is configured to initiate operations for implementing the voting app. The operations of the voting app include: taking in by the voting app personal information and a pre-assigned code; validating the personal information for the pre-assigned code by the voting app; registering a user associated with the personal information and the pre-assigned code by the voting app with a cloud-based voting authority server; authenticating the user by the voting authority server; and authorizing, by the voting authority server, the user to use the voting app during voting.

10 Claims, 9 Drawing Sheets

APP ASSISTED VOTING

COPYRIGHT OR MASK WORK NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD

The following description relates to voting. More particularly, the following description relates to app assisted voting.

BACKGROUND

Conventionally, in some elections, local voters either visit polling places in precincts to cast ballots in an election period or send mail-in ballots via the post before a deadline.

SUMMARY

In accordance with one or more below described examples, a method relating generally to app assisted voting is disclosed. In such a method, a voting app is installed in a mobile device. The mobile device has a memory configured to store program code for the voting app. The mobile device has a processor coupled to the memory. The processor, in response to executing the program code, is configured to initiate operations for implementing the voting app. The operations of the voting app include: taking in by the voting app personal information and a pre-assigned code; validating the personal information for the pre-assigned code by the voting app; registering a user associated with the personal information and the pre-assigned code by the voting app with a cloud-based voting authority server; authenticating the user by the voting authority server; and authorizing, by the voting authority server, the user to use the voting app during voting.

In accordance with one or more below described examples, a system relating generally to app assisted voting is disclosed. In such a system, a voting app is installed in a mobile device. The mobile device has a memory configured to store program code for the voting app. The mobile device has a processor coupled to the memory. The processor, in response to executing the program code, is configured to initiate operations for implementing the voting app. The operations of the voting app include: taking in by the voting app personal information and a pre-assigned code; validating the personal information for the pre-assigned code by the voting app; registering a user associated with the personal information and the pre-assigned code by the voting app with a cloud-based voting authority server; authenticating the user by the voting authority server; and authorizing, by the voting authority server, the user to use the voting app during voting.

In accordance with one or more below described examples, a method relating generally to app assisted voting is disclosed. In such a method, a voting app is installed in a mobile device. The mobile device has a memory configured to store program code for the voting app. The mobile device has a processor coupled to the memory. The processor, in response to executing the program code, is configured to initiate operations for implementing the voting app including: taking in by the voting app personal information and a pre-assigned code; validating the personal information for the pre-assigned code by the voting app; registering a user associated with the personal information and the pre-assigned code by the voting app with a cloud-based voting authority server; requesting an access token by the voting app of the cloud-based voting authority server; authenticating the user by the voting authority server; and authorizing, by the voting authority server, the user to use the voting app during voting by returning the access token.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 2-1 is a flow diagram depicting an example of an app assisted pre-voting process.

FIG. 2-2 is a flow diagram depicting an example of an app assisted voting process.

FIG. 2-3 is a flow diagram depicting an example of an app assisted voting process.

FIG. 3 is a pictorial diagram depicting an example of a polling place.

DETAILED DESCRIPTION

Figure 1:
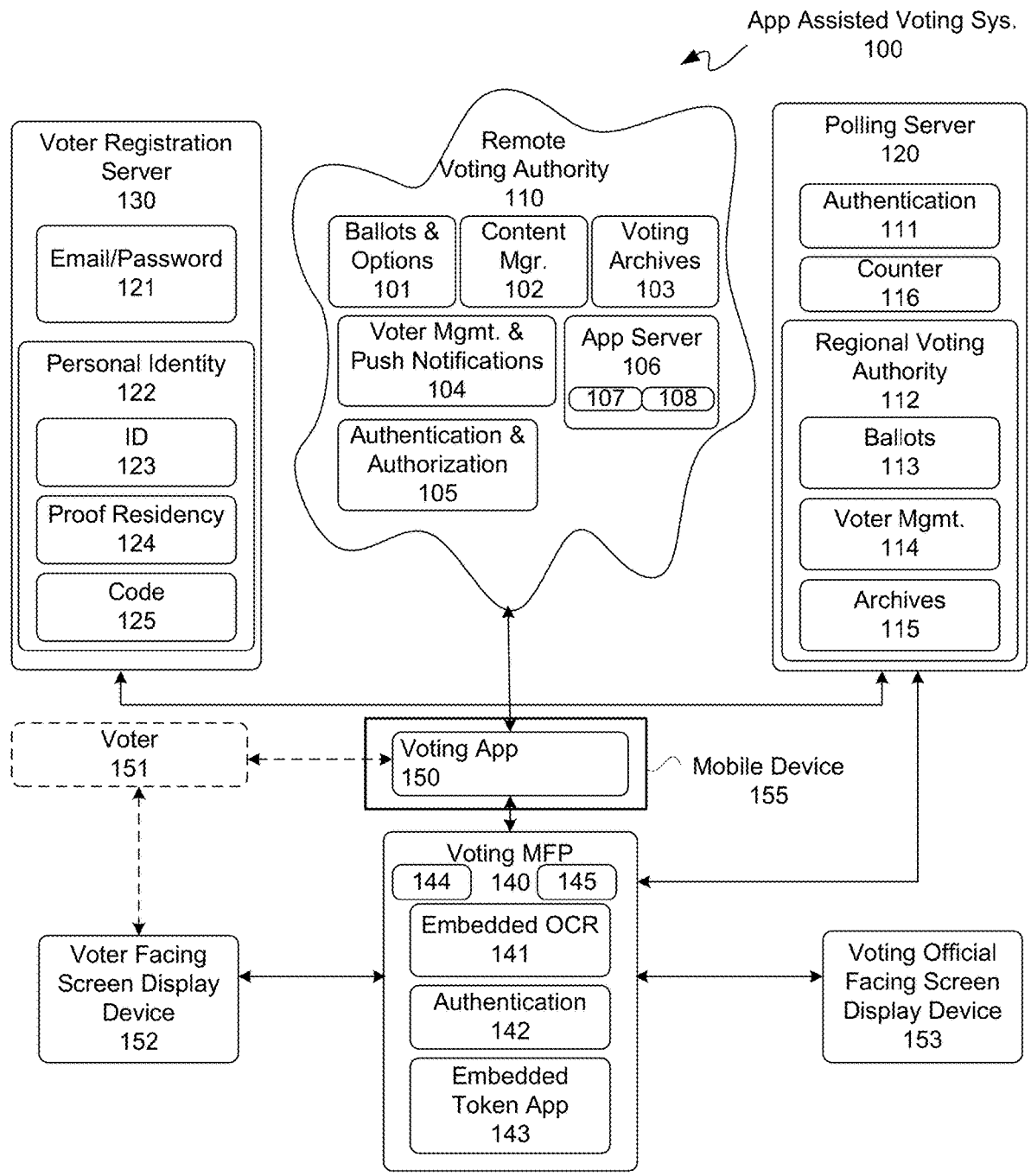
FIG. 1 is a block diagram depicting an example of an app assisted voting system.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

There are one or more issues with voting at polling places. Some examples may include misidentification of voters, lost/uncounted/miscounted votes, and/or fraud. In the event of "hanging chads" or "missing ballot boxes", a voter's original intent may be obscured or lost by damaged or missing ballots. Avoiding and/or reducing harm of one or more of these issues may be addressed by a voting app, including system and method therefor, as described below in additional detail. Furthermore, as described below in additional detail a voting app may be help to detect and/or prevent fraud at a voting device or polling place level. Along those lines, a voting authority can use a voting app to collect data for providing sampled exit polling data.

As described below in additional detail reducing misidentification of voters, reducing lost votes, reducing uncounted, and/or reducing miscounted votes may be benefits of a voting application or app, as described below. Additionally, a voting app may potentially reduce voting fraud. In general, prior to casting a vote, a voting person should be registered and eligible to vote in a particular election. For purposes of clarity by way of example and not limitation, the following description is for voting in person at a voting polling place. However, a variation of may be used for a mail-in ballot, as described below in additional detail.

With the above general understanding borne in mind, various configurations for voting systems, and methods therefor, are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1 is a block diagram depicting an example of an app assisted voting system 100. App assisted voting system 100 includes a cloud or other remote network-based voting authority server ("remote voting authority") 110, a mobile device 155 having a voting app 150, a voting configured multi-function printer ("voting MFP") 140, a polling server 120, and a voter registration server 130. In this example, a voter facing screen display device 152 and a voting official facing screen display device 153 are coupled as external devices to voting MFP 140; however, in another example, either or both of screen display devices 152 and 153 may be incorporated into voting MFP 140.

Figures 1, 2:
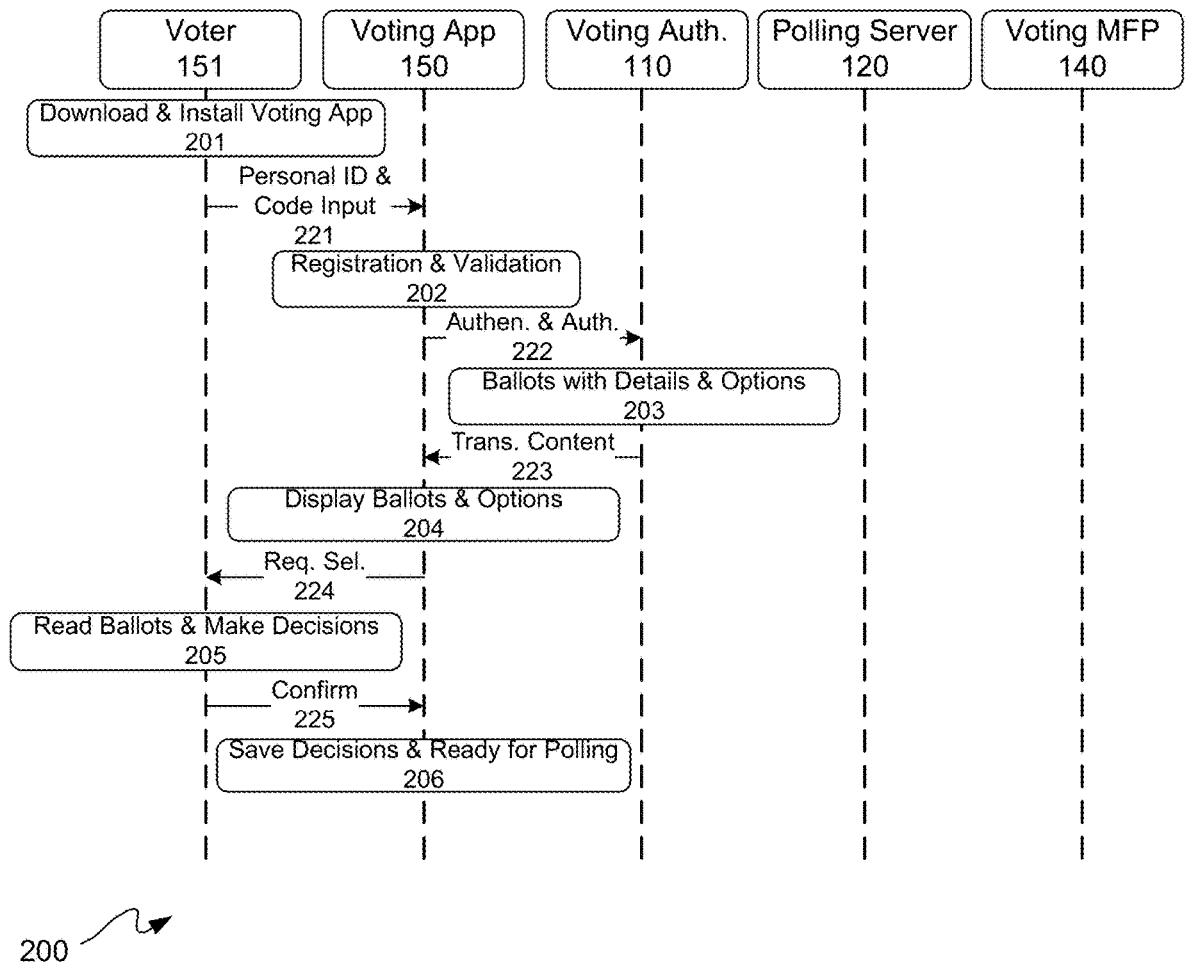
Figure 2:
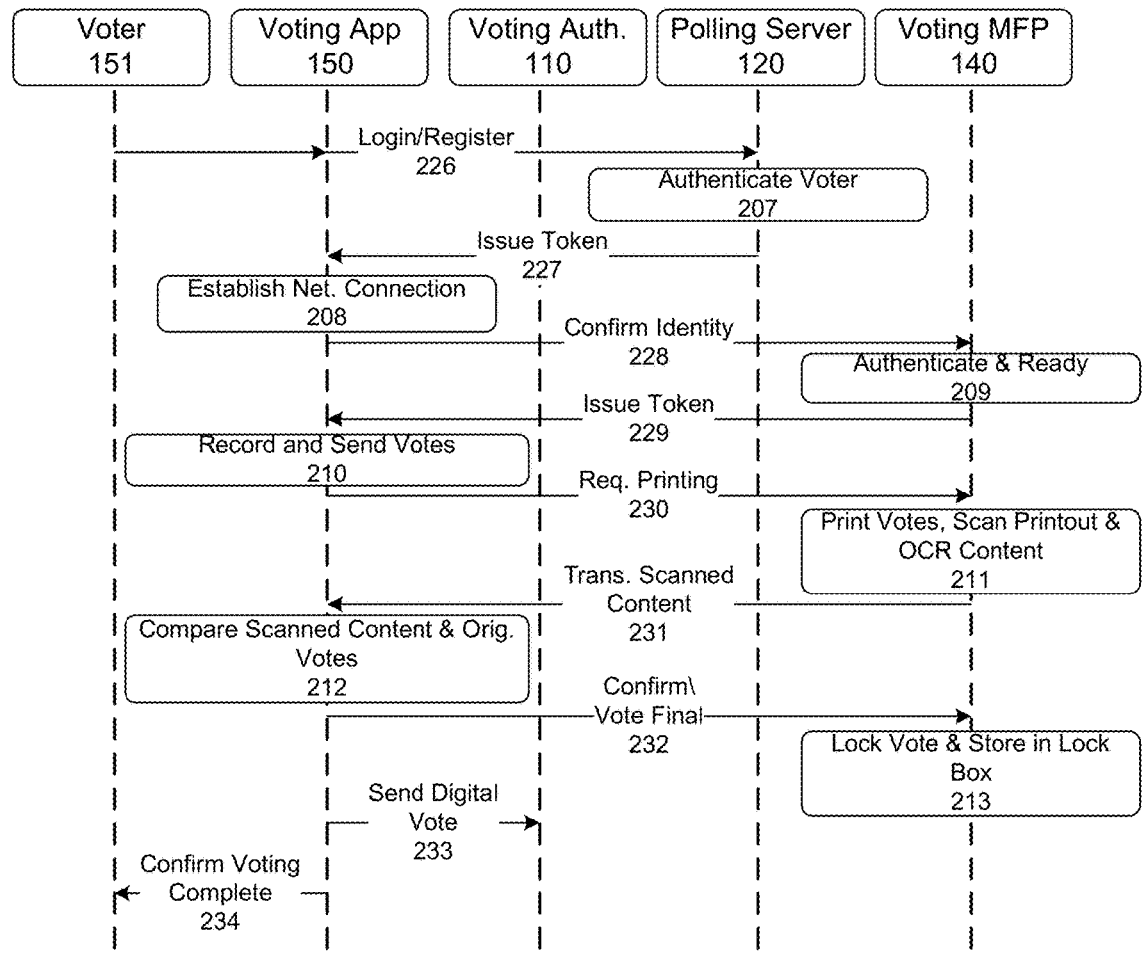

FIG. 2-1 is a flow diagram depicting an example of an app assisted pre-voting process 200. As app assisted pre-voting process 200 may be used with app assisted voting system 100, FIGS. 1 and 2-1 are further described with simultaneous reference to each.

A voting app 150 as described below in additional detail may be downloaded and installed in a mobile device 155 by a voter 151 at operation 201. Along those lines, voting app 150 may be downloaded from an app server 106 of remote voting authority 110 and/or from a general app store for installation into a mobile device 155. A mobile device 155 may be a smart phone, tablet, notebook computer, or similar portable or mobile device.

Mobile device 155 may have a memory configured to store program code for voting app 150, as well as an operating system, such as iOS, Android, or the like. Furthermore, mobile device 155 may have a processor coupled to such memory, wherein such processor, in response to executing program code for voting app 150, is configured to initiate operations for implementing voting app 150, as described below in additional detail.

Conventionally, when a person is registered to vote in an election, they may be mailed election ballot related paperwork including which voting place they can visit to cast their ballot. When a person arrives at a voting place, they may need to provide identification proving they are registered to vote in this voting polling place or precinct. This is conventionally done with a state issued photo identification card and/or though other forms of acceptable identification ("ID"). Furthermore, some polling places use signature matching machines to match a signature of a mail-in ballot and/or an in-person ballot for purposes of identification.

As described below in additional detail, voters can use their mobile devices ("phones") 155 to help identify themselves and to aid in a voting process. After a voter, such as for example a voter 151, installs a voting app 150 on a phone 155, voter 151 may be prompted at operation 221 to register an account with an online state, national, or regional "voting authority". In this example, a cloud-based remote voting authority 110, which may coordinate with a regional voting authority 112, is described; however, in another example another type of voting authority hierarchy may be used.

Regional voting authority 112 may be responsible for all ballots, management of voters, and voter-voting records of actual voting. Remote voting authority 110 may be responsible for all ballots, content management, and voting archives.

For regional voting authority 112 responsibilities are generally indicated as ballots 113, voter management 114, and archives 115, may be implemented in part as electronic records. For example, ballots 113 may be stored electronically. Voter rolls may be stored electronically in a database as voter management 114. Voter voting records and other voter-related information may be stored in a database as archives 115.

For remote voting authority 110, responsibilities are generally indicated as ballots and options 101, content management/manager 102, and voting archives 103. For example, ballots and options thereof may be stored electronically for download to a voting app 150. Content of such ballots and options thereof may be managed for download and otherwise managed by a content manager 102, to ensure correct materials are sent to a voter, such as for an appropriate voting district. Voting archives 103 may store prior ballots and options. Additionally, remote voting authority 110 may include a voter management and push notifications module 104 to send notices to voters as to changes or other issues associated with a ballot. For example, if a candidate drops out of an election or changes party affiliation, push notices may be sent to voting apps 150 of affected voters.

A regional voting authority 112 may be part of a polling server 120. Polling server 120 may include security, such as an authentication module ("authentication") 111. Polling server 120 may further include a counter 116, as described below in additional detail. Voting authority may include an authentication and authorization module 105 for access to records thereof and other operations, as described below in additional detail.

At operation 221, personal information and a pre-assigned code may be taken in by or input to voting app 150. For example, at operation 221, a voter 151 may input into voting app 150 personal ID information and a code. This information and code may be stored in phone 155 in an encrypted form. Such personal ID and code may be used to associated a voter 151 as a person and registered voter. Such a code may be included on voting materials mailed to a voter 151, as described below in additional detail.

After installing voting app 150 and associating one's identity as a person and registered voter with such app, such personal ID and code, a voting app 150 may work with a remote voting authority 110 to register a user for using voting app 150, including validating voter information, at operation 202. In other words, personal information for a pre-assigned code may be validated by voting app 150. Thus, voting app 150 may prompt a user to register with a voter registration server 130 and a voting authority 110.

At operation 202, a user associated with such personal information and a corresponding pre-assigned code can register with a voting authority to use voting app 150 for in-person voting. Such validation may include authenticating at operation 222 such a voter with an authentication and authorization module 105 of remote voting authority 110, and after authentication, such remote voting authority 110 may authorize at operation 222 access at operation 203 to ballot materials, such as of ballots and options module 101. This authorization may likewise include an authorization to use voting app 150 during in-person voting. Along those lines, a voter via a voting app 150 authorized to be used for in-person voting may in effect be subsequently authenticated using such a pre-authorized voting app 150 as a proxy, including providing a code to such voting app 150 as described below in additional detail.

At operation 203, a ballot, which may include ballot materials, may be obtained for a voter 151 by remote voting authority 110. Such ballot obtained may be associated with a voter's polling place, precinct, district, state, and/or other voting specific designation. Such ballot materials may include details and options for selections. At operation 223, after authentication and authorization, information obtained at operation 203 for a registered voter may be transferred to voting app 150. Furthermore, at operation 223, one or more ballots and options thereof may be sent to a registered app user. Such content may be polling place, district, state, and/or precinct dependent.

Voting app 150 may prompt a person to login to a voter registration server 130 for a registration and validation operation 202. In an example, a voting app 150 may allow a person to login with a third-party online account, such as Facebook, Google, or other third-party account. Optionally, or additionally, a person may login with email address plus a password.

Voter registration server 130 may include email and password information, such as in email/password database 121, for each voter registering or seeking registration. Voter registration server 130 may include a personal ID database 122 for each voter registering or seeking registration. Such personal ID database 122 may include an ID field 123, a residency field 124, and a code field 125 for each voter entry.

During a registration process, voting app 150 may ask a person to fill in personal identifying information (e.g., full name, Social Security, date of birth, and/or other identifying information). Such information may be the same or similar to what a government asks for other services. This information may help determine an extent to which a person is eligible to use voting app 150. The mere possession of this personally identifying information may not be enough to prove identity. In other words, this type of login may not be proof of a person's identity. However, this can be remedied with a visit to an actual polling place. Proof of residency for the purpose of voting can be partly established by obtaining a special code, such as for code field 125, mailed to a residential address, or sent to phone 155 as part of a two-way authentication. Such code may be entered into voting app 150.

Voting and ballot information is often mailed to a registered voter prior to an election. Such mailing can also be used to provide a special code, which may be a barcode or QR code, so user can scan with such code into voting app 150 with phone 155. A combination of a login, personal identifying information, and proof of residency may allow a person to use voting app 150 at a voting place to enhance a voting process.

After a person registers using voting app 150, they can be recognized by a remote voting authority 110 as eligible to use voting app 150 for particular elections, as described below in additional detail. Along those lines, voter registration server 130 may communicate with polling server 120 and remote voting authority 110 to indicate such eligibility to use voting app 150, as well as for subsequent authentication by polling server 120 and remote voting authority 110.

Using voting app 150, a voter 151 can view eligible ballots on their phone 155, and can select, fill out, and/or save ballot options for elections. Additionally, using voting app 150, a voter 151 can view information about polling places, where they are eligible to visit to cast votes, and ultimately participate in casting a ballot at one of such polling places.

A remote voting authority 110 may reference a user's provided information against voting rolls, and verify a special code sent to their residence matches records. Along those lines, remote voting authority 110 may have an authentication and authorization module 105 for such verification. Additionally, or optionally, polling server 120, which may have an authentication module 111 for such verification, may be accessed by remote voting authority 110 to verify such information. Once a person completes such one or more authentication(s), then a voter 151 can become a registered app user for using voting app 150 for app assisted voting at a polling place.

Again, voting app 150 is not for online voting. Rather, voting app 150 is for assisting a voter to vote at a polling place. Along those lines, a registered app user may display one or more ballots and options thereof at operation 204 on phone 155. A registered app user may view, select ballot options, such as by logging into remote voting authority 110 and using ballot and options module 101 to download content for transfer at operation 223 into phone 155 for display thereon at operation 204.

At operation 224, voting app 150 may request a registered app user to enter selections in advance of actual voting. At operation 205, a registered app user may read such one or more ballots and make decisions.

At operation 225, voting app 150 may ask a registered app user to confirm their choices or selections by displaying such selections and a selectable confirmation box. At operation 206, a registered app user may save their decisions, such as for an election ballot, on their phone 155 prior to visiting a voting place so they are ready for in-person voting. A ready for polling or voting message ("ready for polling message") may be displayed on phone 155 by voting app 150 at operation 206 in response to assertion or selection of a confirmation from operation 225. This pre-voting readiness allows a voter to save time in voting at a polling place.

Conventionally, a person must establish their identity and eligibility to vote with polling place officials prior to casting ballots. In app assisted voting, a person still provides normal personal identification, such as for example a state issued ID, but also identifies themselves by using voting app 150.

FIG. 2-2 is a flow diagram depicting an example of an app assisted voting process 250. As app assisted voting process 250 may be used with app assisted voting system 100, FIGS. 1 and 2-2 are further described with simultaneous reference to each.

At a polling place, a voter 151 may login and register, if not already registered, at operation 226 with a polling server 120. For example, a registered app user can tap their phone 155 on a near-field communication ("NFC") contact area 144, or other near-field communication, of a voting MFP 140. Voting MFP 140 may further include embedded optical character recognition 141 for use with a scanner thereof. Additionally, voting MFP 140 may include an authentication module 142 and an embedded token app 143.

After login at operation 226, voting app 150 stored identification info may be decrypted and displayed in clear text to polling place official on display device 153. In parallel with such display, authentication module 142 may authenticate such identification information, including communicating with polling server 120 for such authentication via authentication module 111 thereof, at operation 207. Optionally, such a polling place official may then match conventional personal identification against voting rolls as part of operation 207, and match such normal personal identification against displayed voting app authenticated identification information. Once such identities are confirmed, a registered user may be permitted to use app assisted voting with voting app 150 by having voting MFP 140 via an embedded token app 143 issue a token at operation 227. A pre-authorized voting app 150 with such a token may be used as a proxy for authentication of a voter associated therewith, which may be used with one or more other forms of authentication as described elsewhere herein.

Voting MFP 140 may contain a voter facing screen and a voting official facing screen, one or more NFC contact areas 144, WIFI-direct network interface 145, a scanner or imager, and a printer engine. In this example, separate display devices 152 and 153 are used for a voter facing screen and a voting official facing screen, respectively. In another example, a swiveling voter/voting official facing screen may be used. Voting MFP is capable of printing out ballots with ballot options selections already marked.

Generally, an officially identified voter may proceed with app assisted voting by opening voting app 150 on their phone 155, selecting a ballot they have already filled out for this election, and selecting a "vote now" button displayed on phone 155.

More particularly, in this example, voting app 150 may instruct a user to move their phone 155 to an NFC contact area 144 until voting app 150 and voting MFP 140 display messages to remove phone 150. Communication between voting app 150 and voting MFP 140 can start with NFC communication and then continue using a Wi-Fi-direct and/or similar networking technologies for establishment of a local network connection 208 using token 227, namely an access network token. As part of establishing a network connection, at operation 228 an identity of a prospective voter may request confirmation. Assuming such an identity is confirmed by voting MFP 140 using authentication module 142 thereof at operation 209.

After authentication, voting MFP 140 is readied for voting, and voting MFP 140 issues a token at operation 229 using embedded token app 143. This token may be an access voting MFP 140 "election token," such as to access a printer or scanner thereof. Voting app 150 may record such election token at operation 210.

At operation 210, pre-selected votes may be sent along with such token issued at 229. At operation 230, a request from voting app 150 to voting MFP to print a voter's votes may be made. At operation 211, voting MFP 140 may print out a voter's selections on a ballot. Such a printout may be scanned by MFP 140 to create an image record thereof for a voter 151. Furthermore, using embedded OCR module 141, MFP 140 may create a texted-based input of a scanned in ballot to record votes electronically.

Upon success, a voting MFP 140 printout of a ballot marked with selections that reflect app user's saved selections may be transferred back to voting app 150 as scanned content at operation 231. At operation 212, a user can then inspect the such a scanned-in version of a printed-out ballot to ensure all selections match their original selections. Along those lines, optionally, an election token issued at operation 229 may be included as part of a printout, and thus included as part of scanned content. Voting app 150 may display such recorded election token along with such scanned content. A user may ensure that the alphanumerical election token printed on a scanned page matches an election token shown by voting app 150 on phone 155. If a match does not occur, then an error has occurred and a voting official should be notified.

Afterwards, a user may cast a paper ballot printout from voting MFP 140 in a lock box for later counting and/or directly into a ballot "counter". Optionally, voting app 150 can be used to scan a completed ballot to quickly determine if a paper printout ballot matches options selected in voting app 150. In such an example, a scanning may involve asking a user to position their phone 155, similar to taking photos, of each ballot page. Voting app 150 may either automatically determine when to take photos for matching purposes, or ask a user to take photos when a ballot appears in view. Voting app 150 may also check for a match of an election token.

Voting app 150 allows for potentially greater accessibility support for voters that have disabilities. NFC contact areas may be located on both lower and upper parts of voting MFP 140. This accommodates placement of voting MFP 140 on tables or at differing heights relative to a person's reach. Voting app 150 and voting MFP 140 are more accessible to wheelchair users. Moreover, voice commands may be used with a phone 155, which can be useful for people with vision disabilities.

In this example, after comparing at operation 212, voting app 150 confirms a match for a final vote confirmation at operation 232. Which confirmation at operation 232 may be sent to voting MFP 140. Voting MFP 140 may lock a voter's ballot or vote at operation 212. Such locking may include placing a printed-out ballot of a voter 151 in a lock box, and/or encrypting such vote for storage for later retrieval.

At operation 233, voting app 150 may send a digital vote to voting authority 110. Voter identification information in phone 155, which may include a two-step verification, may be used for authentication. A digital vote may be used for auditing a count at a later time. Along those lines, a ballot, and all aggregated ballot counts, may be sent to an authority organization, including for example voting authority 110. At operation 234, voting app 150 may optionally display a message on phone 155 to confirm to a voter that voting has been completed.

With regard to voting app 150 transmitting ballot information to voting authority 110, which may be done when possible over a network or physically via a portable memory device, as network conditions may not allow transmission while at a polling place. Push notifications may be sent to a user, such as for example periodically, via voter management and push notifications module 104, to remind them to connect to a network and allow voting app to try and upload its info. Voting app 150 may further send notifications via an OS to a user. For example, if a user's device is in an airplane mode, travelling, or other instance having no presently available network connection to receive push notifications from servers, OS sent notifications may be used.

Voting selections made, as well as other information, may be sent to one or more voting authority servers. If transmission does not occur in a timely manner, a voter's ballot is not automatically invalidated, but rather held as a provisional vote until verified by a voting official.

Voting app 150 may not guarantee individual app user's votes are kept confidential. While a ballot may be delinked from a voter's identity after voting by removing any association of an election token and a voter's identity, in another example such association may be maintained. For example, voting authority 110 may store voting app user identities, full name, other personal identifying information, login data, verification status, and records of elections. Such records of elections may include each election a user was authorized to vote in. Election tokens may be associated with each of those elections.

Voting authority 110 may store a mapping of election tokens and actual voting selections made for each corresponding election. This mapping may be stored in different systems, which may or may not include voting app 150, as voting apps may include corresponding user identities and other information as previously described. Election tokens and actual votes may be stored, such as in voting archives 103 for example, to deter fraud via auditing processes. Fraud, such as alteration of votes, alteration of vote tallies, fraudulent voters, or other voting fraud, may occur at a polling place at an individual voting machine level or at a higher level. It may also occur by individuals attempting to cast ballots when not authorized or by assuming false identities.

In an example, when a voting app user registers to vote in an election using voting app 150, an election token 107 may generated by voting authority 110, such as by app server 106 for example, and stored with an app user's identity information 108, such as in app server 106 for example. An election token 107 may be is used to uniquely identify a voting ballot, both electronically and in paper form. An algorithm may be used such that an election token 107 generated by application server 106 matches a corresponding election token generated at operation 229 by voting MFP 140, such as by embedded token app 143. Again, each election token may be printed on a ballot. In another example, data, based on election token, may be printed on a ballot, such as encrypted using a public-key of a voting authority or otherwise.

In an example, each polling place may have associated therewith cryptographic keys, such as public- and private-keys. A polling place may hold a private-key, and a voting authority 110 may have a copy of a corresponding public-key. This allows a polling place to create encrypted messages that a voting authority 110 can decrypt and verify as having been uniquely created by such polling place.

Figures 2, 3:
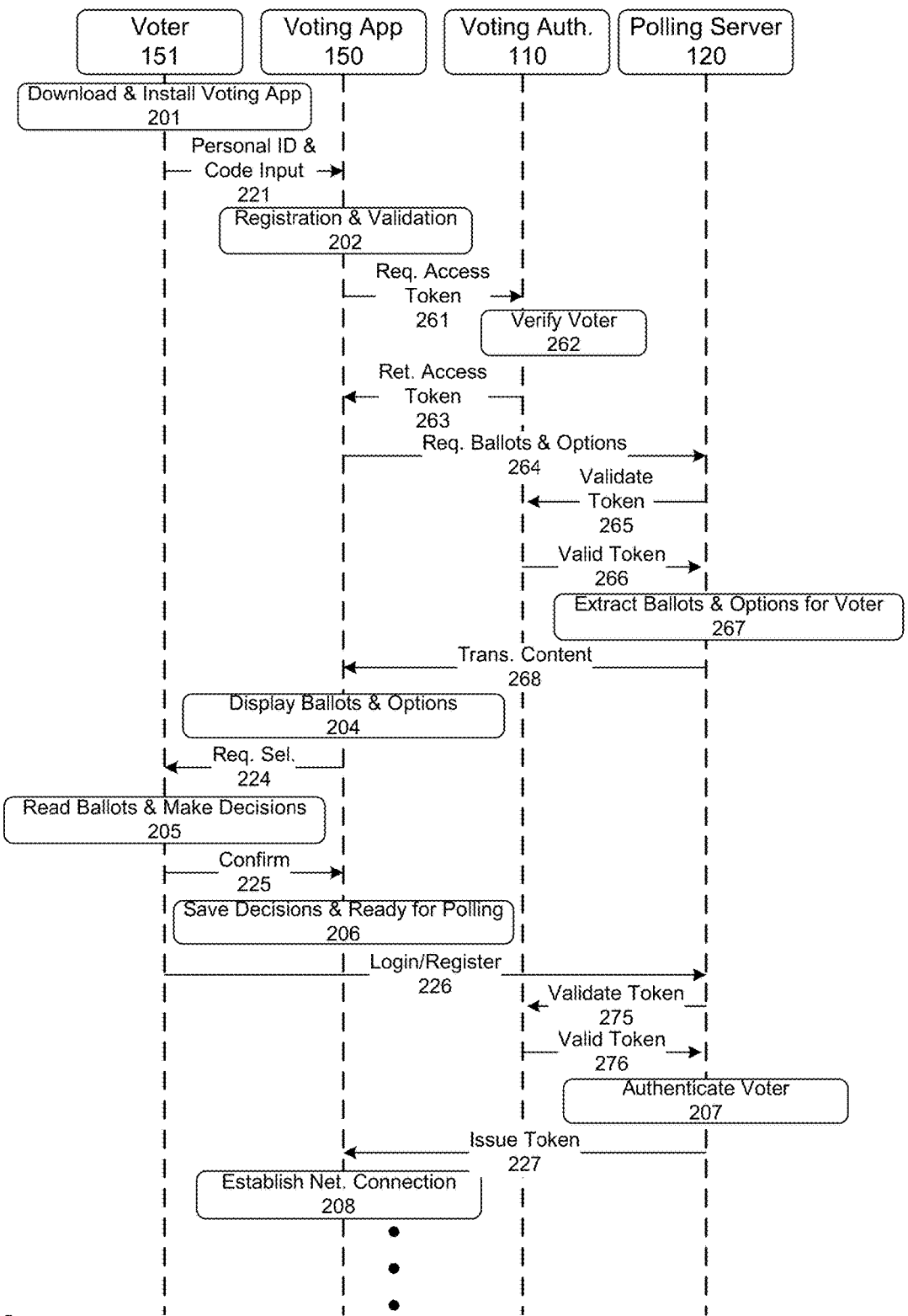
Figure 3:
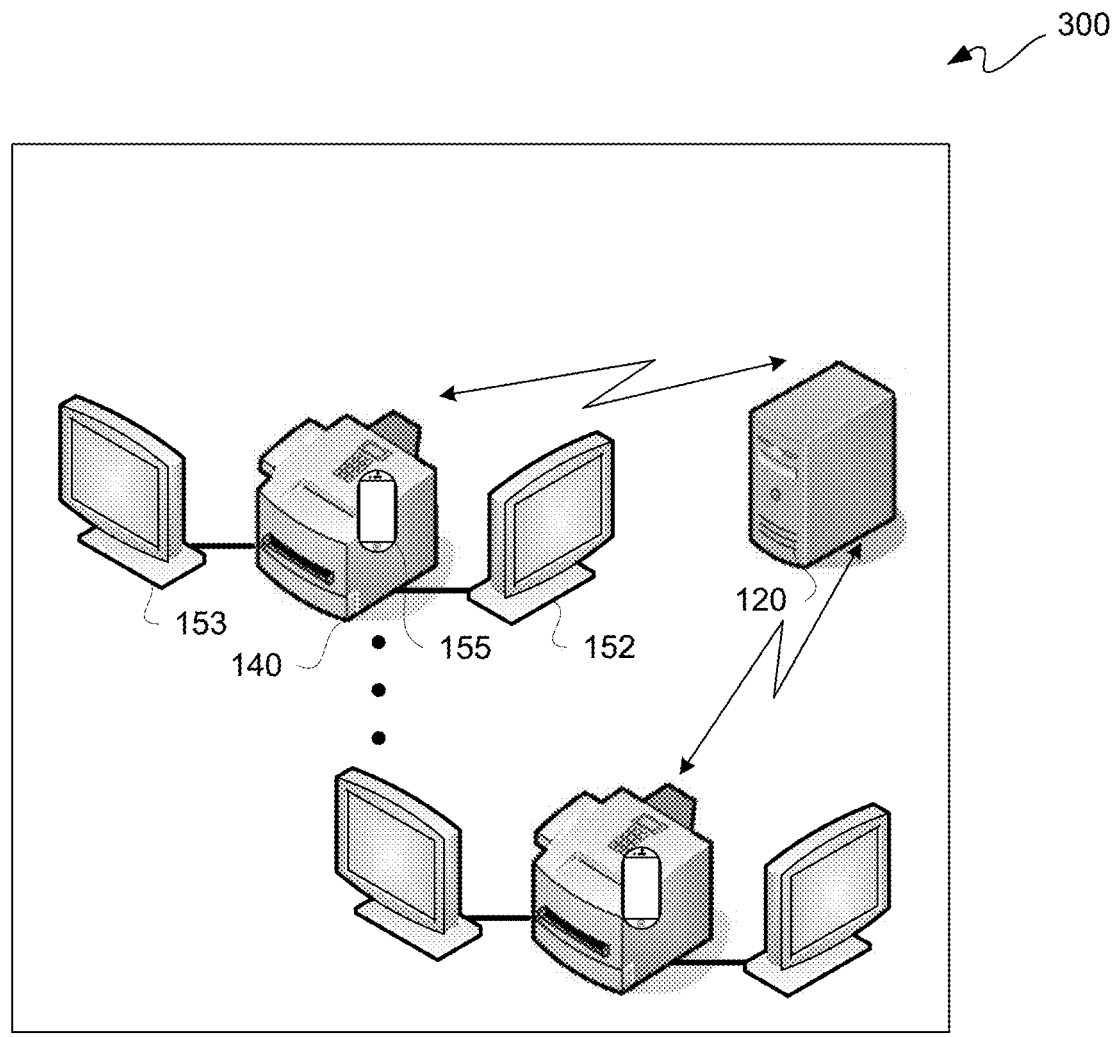

FIG. 3 is a pictorial diagram depicting an example of a polling place 300. Polling place 300 is further described with simultaneous reference to FIGS. 1 through 3. Along those lines, examples of previously described authentication operations are described in additional detail for purposes of clarity by way of example and not limitation, as these or other forms of public-private key encryption/decryption may be used.

Each polling place 300 may contain a number of voting MFPs 140. Each MFP 140 may contain cryptographic keys, such as public- and private-keys. A polling server 120 may be network connected to each MFP 140, such as via direct Wi-Fi for example. Communication may be such that each MFP 140 can encrypt messages using either a private-key of a voting MFP or a public-key of a polling server 120 depending on application. MFPs 140 may encrypt messages and send them to polling server 120 for decryption. In another example, rather than a public-private-key pair, both keys may be private-keys or a Kerberos system for cryptographic keys may be used.

In an example, a voting app user may visit a polling place 300. Such a user may be instructed to place their phone 155 on a voting MFP's NFC contact area 144 to initiate transmitting of app stored identification. If voting app 150 has a network connection, voting MFP 140 may provide voting app 150 a public-key of a corresponding voting MFP 140, a random or pseudo random nonce value, and a user's claimed ID. Such information provided to voting app 150 may in whole or in part be signed using a private-key of polling place 300 and then encrypt with a public-key of voting authority 110. Voting app 150 may then ask voting authority 110 to provide identity credentials and an election token that MFP 140 can understand. In response, voting authority 110 may generate a message, such as for example in the form of:

```
encrypt-with-private-key-of-voting-authority(
    [ encrypt-with-public-key-of-MFP( [
    (app user's identity - name, dob, etc.),
    ("election token" generated by voting authority; known to app),
    (information about which ballot voter is eligible for),
    ( nonce originally from MFP)
        ] )
    ] } )
```

A voting app 150 receiving such a message, such as the above example, may provide same to a corresponding voting MFP 140. Voting MFP 140 may decrypt an outer layer of such a message with a public-key of voting authority 110, and after a successful decryption thereof, may decrypt an inner portion of such message using voting MFP's private-key. Voting MFP 140 may use such message to authenticate identity credentials for a voting app user's identity and a corresponding election token to uniquely identify a corresponding ballot, such as electronically and/or on paper.

If a voting app cannot connect to voting authority 110, or is without a network connection, the above described messaging with decryptions may be used, except that voting app 150 may have already stored such message from voting authority 110.

Since a user's phone 155 may not always be able to connect to a network or have a connection to a voting authority 110, a voting authority 110 may preload an encrypted message onto voting app 150, such as when providing an election token, that can uniquely identify a voting app user's identity and eligibility to vote in a particular election to a polling place 300, such as a polling server 120.

As a voting authority 110 may not know an exact internal disposition of a polling place's voting MFPs 140 and other equipment, voting authority 110 might rely on a polling place server, such as polling server 120, to disseminate information. In this example, voting app 150 may provide a message, such as for example:

```
encrypt-with-private-key-of-voting-authority(
    [ encrypt-with-public-key-of-polling-place ( [
        app user's identity,
        "election token" generated by voting authority, and also known
            to app,
        information about which ballot voter is eligible for,
        nonce ?
        ] )
    ] )
```

Voting app 150 may provide such a message to voting MFP 140, which in turn may send such a message and a nonce to polling server 120. Polling server 120 may decrypt such message as such message is encrypted with a public-key of polling server 120. After decryption, polling server 120 may re-encode such message, such as for example into the form of:

```
encrypt-with-private-key-of-polling-place (
    [ encrypt-with-public-key-of-MFP( [
        app user's identity - name, dob, etc.,
        election token" generated by voting authority, and also known
            to app,
        information about which ballot voter is eligible for,
        nonce originally from MFP
        ] )
    ]
)
```

Such a re-encoded message may be from polling server 120 sent to a corresponding voting MFP 140. Such voting MFP 140 may decrypt outer data of such re-encoded message using a public-key of polling server 120, and may decrypt inner data of such re-encoded message using a private-key of voting MFP 140. Voting MFP 140 may use such message to authenticate identity credentials for a voting app user's identity and a corresponding election token to uniquely identify a corresponding ballot, such as electronically and/or on paper. Such provided information may be about which ballot a voter is eligible for and may be used to determine voter eligibility for voting.

As described herein, a voting app user may be authenticated, cleared for a specific ballot, and a voting MFP may know what election token is to be associated with such a ballot. An election token, or an encrypted, hashed, or other variation thereof, may be printed onto a ballot in text and/or bar code.

In an example, voting app 150 may allow a user to select an e-ballot they wish to cast. After pressing "Vote now" or similar message, voting app 150 may transmit a selected e-ballot to a corresponding voting MFP 140. Voting MFP 140 may check such e-ballot, user's identity, voting eligibility, and/or other information. Voting MFP 140 may determine whether and how to print out such e-ballot. Voting MFP 140 may print a user's selections, and such printing may include an associated election token on such printout. Further, because a printout is human readable, an e-ballot can be checked by a voting app user manually for correctness. However, a voting app user may also use a voting app's built in scan option, which has been previously described.

A counter 116, such as may be integrated into a polling server 120, can communicate aggregate votes and collections of election tokens, namely such a ballot counter can count votes and election tokens. In an example of a separate counter, such a separate counter may communicate with polling server 120 via a private-key of a counter 116 and a public-key of polling server 120, and a polling place using a public-key of a counter and a private-key of polling server 120.

Optionally, a counter 116 may communicate it's aggregate and collection results to voting authority 110. Voting authority 110 may use such counts to double check for potential fraud in a polling place 300.

FIG. 2-3 is a flow diagram depicting an example of an app assisted voting process 260. As app assisted voting process 260 may be used with app assisted voting system 100 as well as portions of each of app assisted pre-voting process 200 and app assisted voting processes 250, FIGS. 1 through 2-3 are further described with simultaneous reference to each. However, as details of app assisted voting process 260 overlaps with or are repeats of details of each of processes 200 and 250, generally only differences are described for purposes of clarity and not limitation.

App assisted voting process 260 is the same as app assisted pre-voting process 200 until after operation 202. From voting app 150 after operation 202, a request 261 for an access token may be submitted by voting app 150 for remote voting authority 110. Remote voting authority 110 at operation 262 may verify or authenticate a voter and that same is entitled to vote. In response to a positive verification, remote voting authority 110 may issue or return at operation 263 an access token to voting app 150. Return of an access token in effect authorizes, by remote voting authority 110, a voter 151 is authorized to use voting app 150 during voting. If a request for a token or a token as described herein is not valid or authorized, such irregularity may be reported to a voting official. However, such irregularities, which may occur but seldomly, are not shown or described in unnecessary detail for purposes of clarity and not limitation.

Using such an access token, voting app 150 at operation 264 may request from polling server 120 one or more ballots and options for an associated voter 151. Polling server 120 in response to such request and receipt of an access token may at operation 265 provide such access token to remote voting authority 110 for validation.

For a successful validation operation, remote voting authority may provide an indication that such an access token is valid at operation 266. In response to such a validity indication, at operation 267 polling server 120 may extract one or more ballots and one or more options therefor. Such extracted ballot and option content may be transferred at operation 268 from polling server 120 to voting app 150.

After transfer of content at operation 268, previously described operations 204 through 226 may be performed. Accordingly, such description is not repeated.

After a login/registration operation 226, at operation 275 polling server 120 may request validation of a received token. This token may be an access token returned at operation 263. Such validation may be requested of remote voting authority 110. In reply for a successful validation, an indication of validity of such token may be provided at operation 276 from remote voting authority 110 to polling server 120. Operations 275 and 276 correspond to previously described operation 265 and 266, though at different points in app assisted voting process 260.

After operation 276, operations 207 and subsequent operations therefrom may be performed as previously described.

Because one or more of the examples described herein may be implemented in using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

Figure 4:
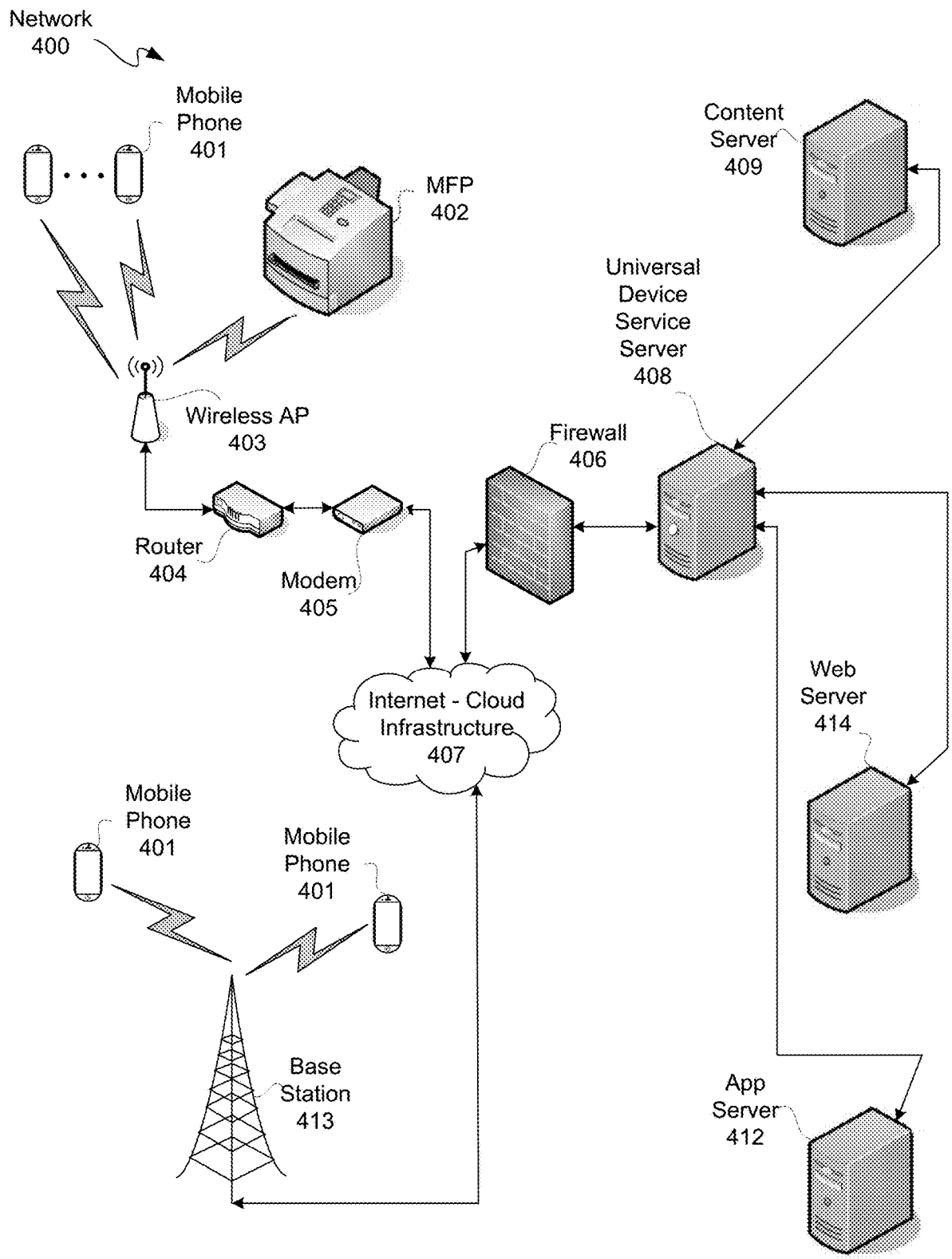
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413. Additionally, a desktop computer and/or a printing device, such as for example a multi-function printer ("MFP") 402, each of which may be web-usable devices, may be in wireless and/or wired communication to and from router 404.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
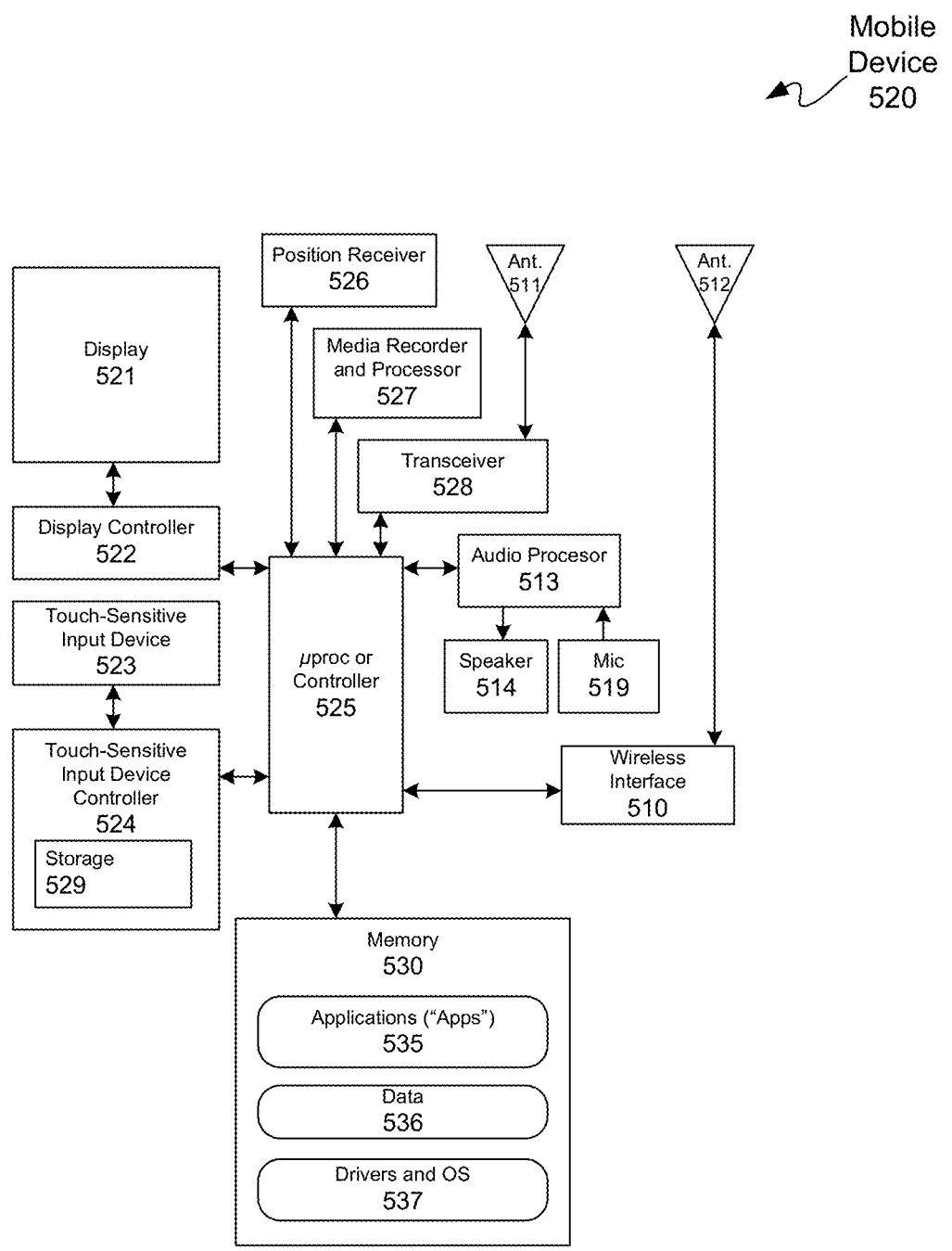
FIG. 5 is block diagram depicting an example of a portable communication device.

FIG. 5 is block diagram depicting an example of a portable communication device ("mobile device") 520. Mobile device 520 may be an example of a mobile device, as previously described.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
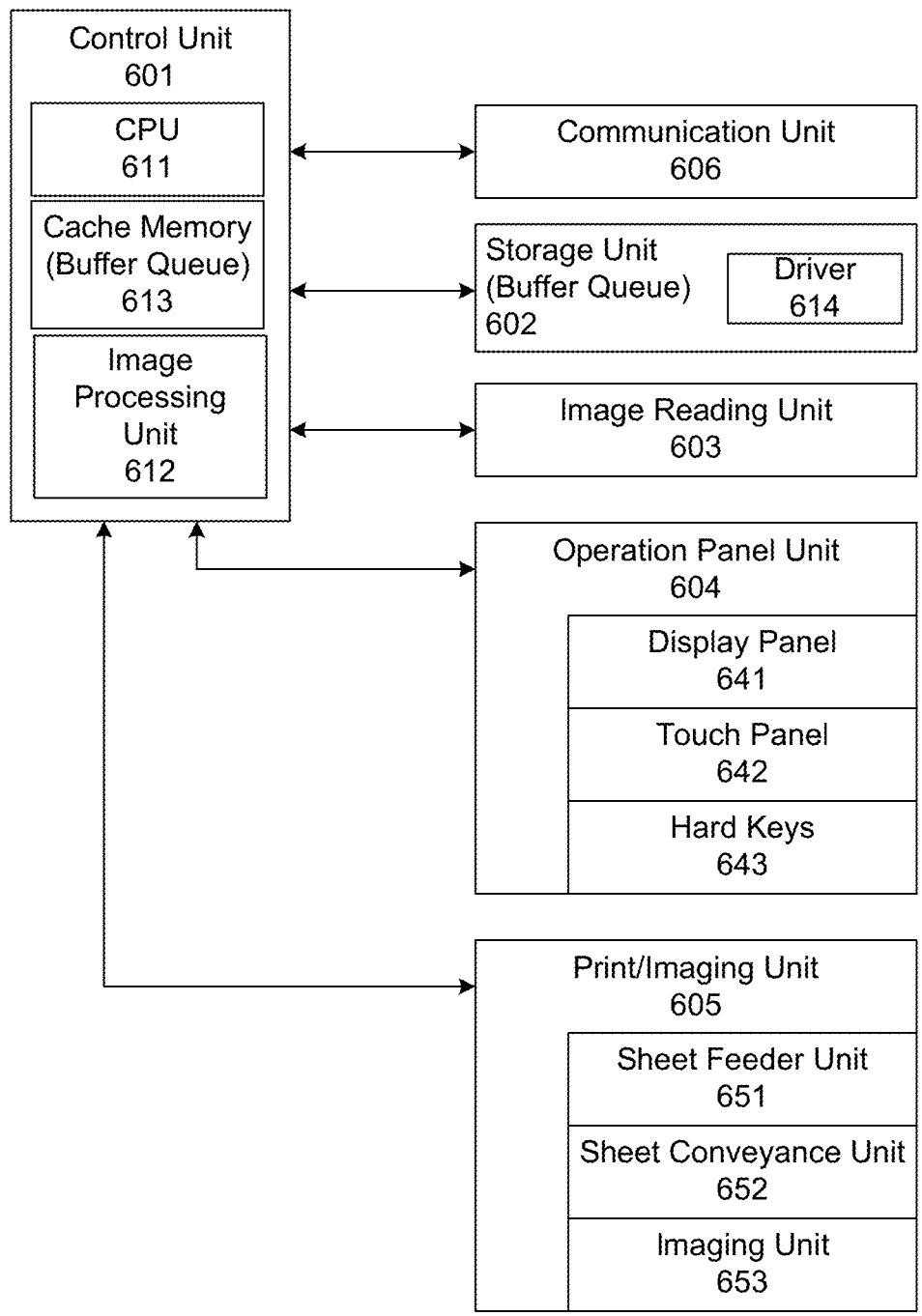
FIG. 6 is a block diagram depicting an example of a multi-function printer ("MFP").

FIG. 6 is a block diagram depicting an example of a multi-function printer (MFP) 600. MFP 600 is provided for purposes of clarity by way of non-limiting example. MFP 600 is an example of an information processing system such as previously described.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer driver 614. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory.

Many known details regarding MFP 600 are not described for purposes of clarity and not limitation.

Figure 7:
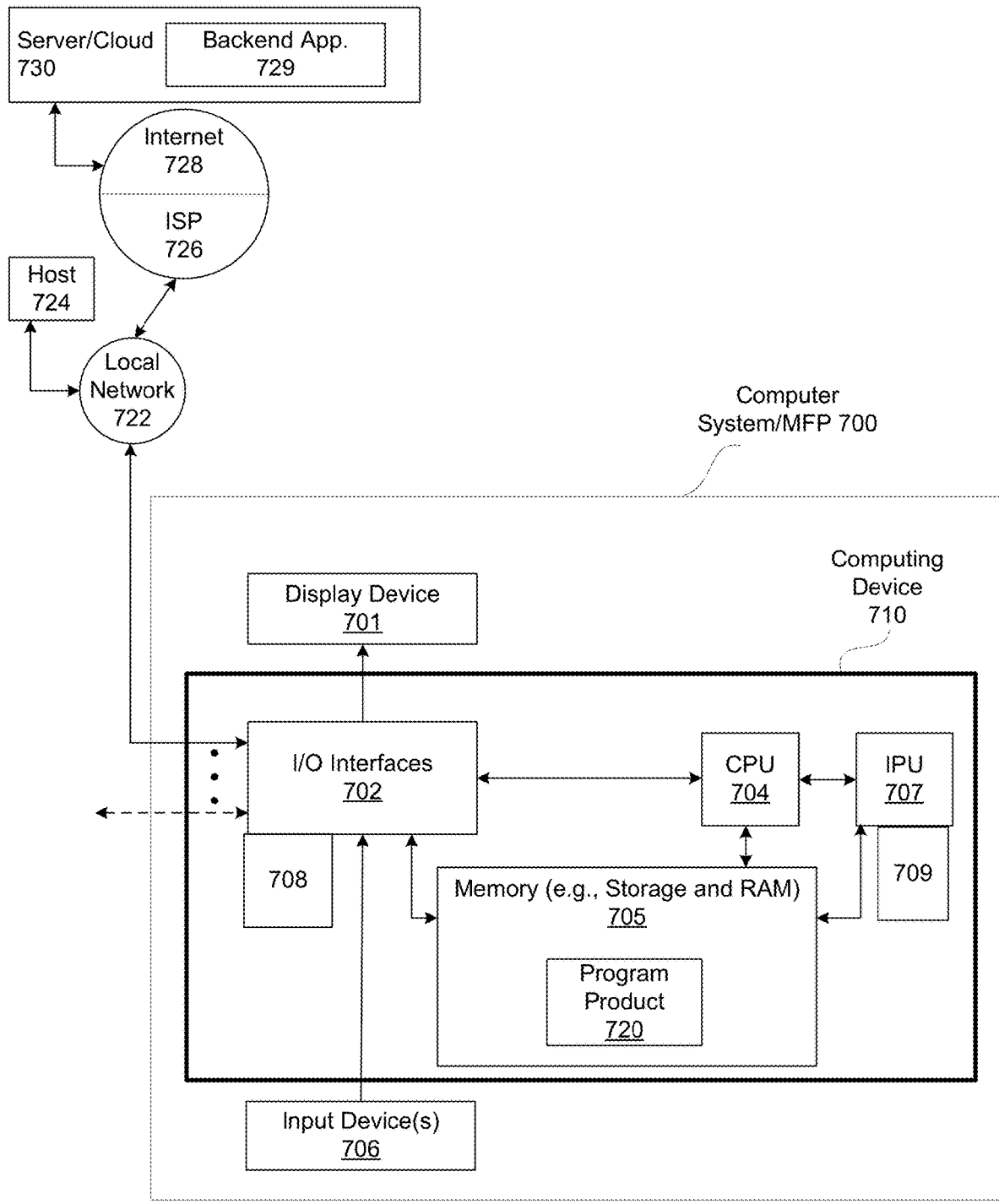
FIG. 7 is a block diagram depicting an example of a computer system.

FIG. 7 is a block diagram depicting an example of a computer system 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for app assisted voting, comprising:
having a voting app installed in a mobile device;
the mobile device having a memory configured to store program code for the voting app;
the mobile device having a processor coupled to the memory, wherein the processor, in response to executing the program code, is configured to initiate operations for implementing the voting app including:
taking in by the voting app personal information and a pre-assigned code;
validating the personal information for the pre-assigned code by the voting app;
registering a user associated with the personal information and the pre-assigned code by the voting app with a cloud-based voting authority server;
authenticating the user by the voting authority server;

authorizing, by the voting authority server, the user to use the voting app during voting;
obtaining a ballot for the user from the voting authority server;
transferring the ballot from the voting authority server to the voting app;
displaying the ballot and options by the voting app on the mobile device;
requesting the user to make selections by the voting app;
displaying by the voting app a confirmation of the selections made;
saving the selections in the memory by the voting app;
displaying a ready for polling message by the voting app responsive to the confirmation;
prompting the user to register with the voting authority by the voting app;
obtaining a login by a voter via the voting app into a polling server;
authenticating the voter by the polling server;
issuing an authentication token by the polling server to the voting app;
establishing a network connection to a voting multi-function printer;
confirming identity of the voter by the voting app with the voting multi-function printer using the authentication token; and
authenticating the voter via the voting app as a proxy.

2. The method according to claim 1, further comprising:
readying the voting multi-function printer for voting;
issuing an election token;
sending the selections to the voting multi-function printer with the election token; and
recording the selections in association with the election token in the voting app.

3. The method according to claim 2, further comprising:
requesting a printout of the selections by the voting app of the voting multi-function printer; and
printing out the selections by the voting multi-function printer.

4. The method according to claim 3, further comprising:
scanning the printout into the voting multi-function printer to provide scanned content;
optically recognizing the selections by the voting multi-function printer;
transmitting the scanned content with the selections to the voting app;
receiving a final confirmation of the scanned content to the voting multi-function printer;
sending a digital vote representative of the scanned content to the polling server; and
informing the voter of completion by the voting app.

5. A system for app assisted voting, comprising:
a voting app installed in a mobile device;
the mobile device having a memory configured to store program code for the voting app;
the mobile device having a processor coupled to the memory, wherein the processor, in response to executing the program code, is configured to initiate operations for implementing the voting app including:
taking in by the voting app personal information and a pre-assigned code;
validating the personal information for the pre-assigned code by the voting app;
registering a user associated with the personal information and the pre-assigned code by the voting app with a cloud-based voting authority server;
authenticating the user by the voting authority server;
authorizing, by the voting authority server, the user to use the voting app during voting;
obtaining a ballot for the user from the voting authority server;
transferring the ballot from the voting authority server to the voting app;
displaying the ballot and options by the voting app on the mobile device;
requesting the user to make selections by the voting app;
displaying by the voting app a confirmation of the selections made;
saving the selections in the memory by the voting app;
displaying a ready for polling message by the voting app responsive to the confirmation;
prompting the user to register with the voting authority by the voting app;
obtaining a login by a voter via the voting app into a polling server;
authenticating the voter by the polling server;
issuing an authentication token by the polling server to the voting app;
establishing a network connection to a voting multi-function printer;
confirming identity of the voter by the voting app with the voting multi-function printer using the authentication token; and
authenticating the voter via the voting app as a proxy.

6. The system according to claim 5, wherein the voting app further comprises:
readying the voting multi-function printer for voting;
issuing an election token;
sending the selections to the voting multi-function printer with the election token; and
recording the selections in association with the election token in the voting app.

7. The system according to claim 6, wherein the voting app further comprises:
requesting a printout of the selections by the voting app of the voting multi-function printer; and
printing out the selections by the voting multi-function printer.

8. The system according to claim 7, wherein the voting app further comprises:
scanning the printout into the voting multi-function printer to provide scanned content;
optically recognizing the selections by the voting multi-function printer;
transmitting the scanned content with the selections to the voting app;
receiving a final confirmation of the scanned content to the voting multi-function printer;
sending a digital vote representative of the scanned content to the polling server; and
informing the voter of completion by the voting app.

9. A method for app assisted voting, comprising:
having a voting app installed in a mobile device;
the mobile device having a memory configured to store program code for the voting app;
the mobile device having a processor coupled to the memory, wherein the processor, in response to executing the program code, is configured to initiate operations for implementing the voting app including:
taking in by the voting app personal information and a pre-assigned code;
validating the personal information for the pre-assigned code by the voting app;

registering a user associated with the personal information and the pre-assigned code by the voting app with a cloud-based voting authority server;

requesting an access token by the voting app of the cloud-based voting authority server;

authenticating the user by the voting authority server;

authorizing, by the voting authority server, the user to use the voting app during voting by returning the access token;

requesting by the voting app a ballot from a polling server including providing the access token to the polling server;

providing the access token from the polling server to the voting authority server for validation;

validating the access token by the voting authority server including providing an indication of validity thereof to the polling server;

obtaining a ballot for the user by the polling server;

transferring the ballot from the polling server to the voting app;

prompting the user to register with the polling server by the voting app;

obtaining a login by the voter via the voting app into the polling server including receipt of the access token;

providing the access token from the polling server to the voting authority server for validation;

re-validating the access token by the voting authority server;

re-indicating validity of the access token by the voting authority server for the polling server;

authenticating the voter by the polling server;

issuing an authentication token by the polling server to the voting app; and establishing a network connection to a voting multi-function printer.

10. The method according to claim 9, further comprising:

confirming identity of the voter by the voting app with the voting multi-function printer using the authentication token; and authenticating the voter via the voting app as a proxy.

\* \* \* \* \*